(12) United States Patent
Hirai

(10) Patent No.: US 7,971,077 B2
(45) Date of Patent: Jun. 28, 2011

(54) INFORMATION PROCESSING APPARATUS, INFORMATION PROCESSING METHOD, AND PROGRAM FOR EXECUTING THE METHOD

(75) Inventor: Masahito Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 11/958,568

(22) Filed: Dec. 18, 2007

(65) Prior Publication Data

US 2008/0155286 A1 Jun. 26, 2008

(30) Foreign Application Priority Data

Dec. 21, 2006 (JP) ................................. 2006-344281
Dec. 10, 2007 (JP) ................................. 2007-318479

(51) Int. Cl.
G06F 1/26 (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| 7,334,146 B2 * | 2/2008 | Kobayashi et al. ........... 713/324 |
| 7,447,757 B2 * | 11/2008 | Muto ............................ 709/223 |
| 7,640,441 B2 * | 12/2009 | Maeda ......................... 713/300 |
| 7,742,179 B2 * | 6/2010 | Ikeda ........................... 358/1.14 |
| 2004/0078539 A1 * | 4/2004 | Fulghum ...................... 711/170 |
| 2006/0212732 A1 * | 9/2006 | Mashimo et al. ............. 713/300 |
| 2007/0240004 A1 * | 10/2007 | Maeda ......................... 713/322 |

* cited by examiner

*Primary Examiner* — Abdelmoniem Elamin
(74) *Attorney, Agent, or Firm* — Canon U.S.A. Inc., I.P. Division

(57) ABSTRACT

An information processing apparatus is disclosed as an example. The information processing apparatus sends data to an image forming apparatus and causes the image forming apparatus to generate an image. The information processing apparatus includes a receiving unit configured to receive information that is sent from an image forming apparatus and indicates whether the image forming apparatus has a power saving function, a determination unit configured to determine, on the basis of the information received by the receiving unit, whether the image forming apparatus has the power saving function, and a setting unit configured to perform setting on a communication program in the information processing apparatus so as to reduce a number of times a power saving mode of the image forming apparatus having the power saving function is released due to communication between the information processing apparatus and the image forming apparatus.

9 Claims, 13 Drawing Sheets

FIG. 3

| DeviceID | IP Address | Power Saving Device? | WSD Available? | CPCA Supported? | Community Name |
|---|---|---|---|---|---|
| 01010111111 | 192.168.1.1 | 0 | 1 | 1 | test |
| 010101111112 | 192.168.1.3 | 1 | 1 | 1 | conon |
| 010101111114 | 192.168.1.2 | 1 | 0 | 1 | jp |
| 010101111115 | 192.168.1.6 | 0 | 0 | 0 | kawasaki |
| 010101111116 | 192.168.1.9 | 1 | 1 | 1 | nakahara |
| 010101111118 | 192.168.1.10 | 0 | 0 | 1 | kosugi |

FIG. 13

| Display: | List ▼ | | | | | |
|---|---|---|---|---|---|---|
| Group Name: | All Devices ▼ | | | | | |
| Device Name ▼ | | Product Name ▼ | Network Interface Board Name ▼ | Location ▼ | Network Address ▼ | Power Saving Device ▼ |
| Laser-2810 | | Conon Laser-2810 | NB-E2 | Room 31 | 192.168.1.1 | × |
| Laser 950LIPS | | Conon Laser-950 | NB-4F | | 192.168.1.3 | ○ |
| ds32clp | | Conon Laser5800 | NB-E2 | Room 43 | 192.168.1.2 | ○ |
| MFP3250 | | Conon MFP3250 | iN-E1 | Building A 9F | 192.168.1.6 | × |
| MFP3250(Doo) | | Conon MFP3250 | iN-E1 | Annex 2F | 192.168.1.9 | ○ |

1301

INFORMATION PROCESSING APPARATUS, INFORMATION PROCESSING METHOD, AND PROGRAM FOR EXECUTING THE METHOD

BACKGROUND OF THE INVENTION

1. Field of the Invention

The present invention relates to an apparatus, a method, a program for executing the method, a medium, and the like that can be adopted in a system that includes a printer having a power saving function and the like.

2. Description of the Related Art

Recently, printers having a power saving function have been increasingly proposed.

In a power saving mode called a quiescent operating state including a hibernation state in a power saving function, the content of a volatile memory unit is copied to a non-volatile memory unit, and then the memory units and an arithmetic unit are stopped. Moreover, in a quiescent operating state, a return from the power saving mode can be triggered by external access via network connection. In this case, electrical power other than that necessary to wait for external access is not supplied to the devices, and thus necessary electrical power can be minimized.

A proposal has been made, in which users can select whether to perform two-way communication so as to reduce the number of accesses to devices; and even in a case where two-way communication is not performed, during a print operation, two-way communication is performed, and when an error has occurred, two-way communication is performed until the error is fixed.

Moreover, another proposal has been made, in which an interval set for canceling (deleting) event notification registration in a printer in a power saving (sleep) mode is controlled so as to be longer than that in a normal mode.

It has been difficult to distinguish devices having a power saving function from devices not having a power saving function.

Moreover, a printer in a quiescent operating state returns from the quiescent operating state upon external access via networks for obtaining the status. Thus, when external access for, e.g., obtaining the status has occurred, the quiescent operating state cannot be kept.

Moreover, in some systems, settings need to be changed manually after installation.

SUMMARY OF THE INVENTION

For example, an information processing apparatus is disclosed. The information processing apparatus sends data to an image forming apparatus and causes the image forming apparatus to generate an image. The information processing apparatus includes a receiving unit configured to receive information that is sent from an image forming apparatus and indicates whether the image forming apparatus has a power saving function, and a determination unit configured to determine, on the basis of the information received by the receiving unit, whether the image forming apparatus has the power saving function.

Further features of the present invention will become apparent from the following description of an exemplary embodiment with reference to the attached drawings.

BRIEF DESCRIPTION OF THE DRAWINGS

FIG. 3 shows an example of MIB information stored in a server PC in FIG. 2.

FIG. 13 shows an exemplary display on a CRT in a client PC.

DESCRIPTION OF THE EMBODIMENTS

Exemplary Embodiment

Figure 10:
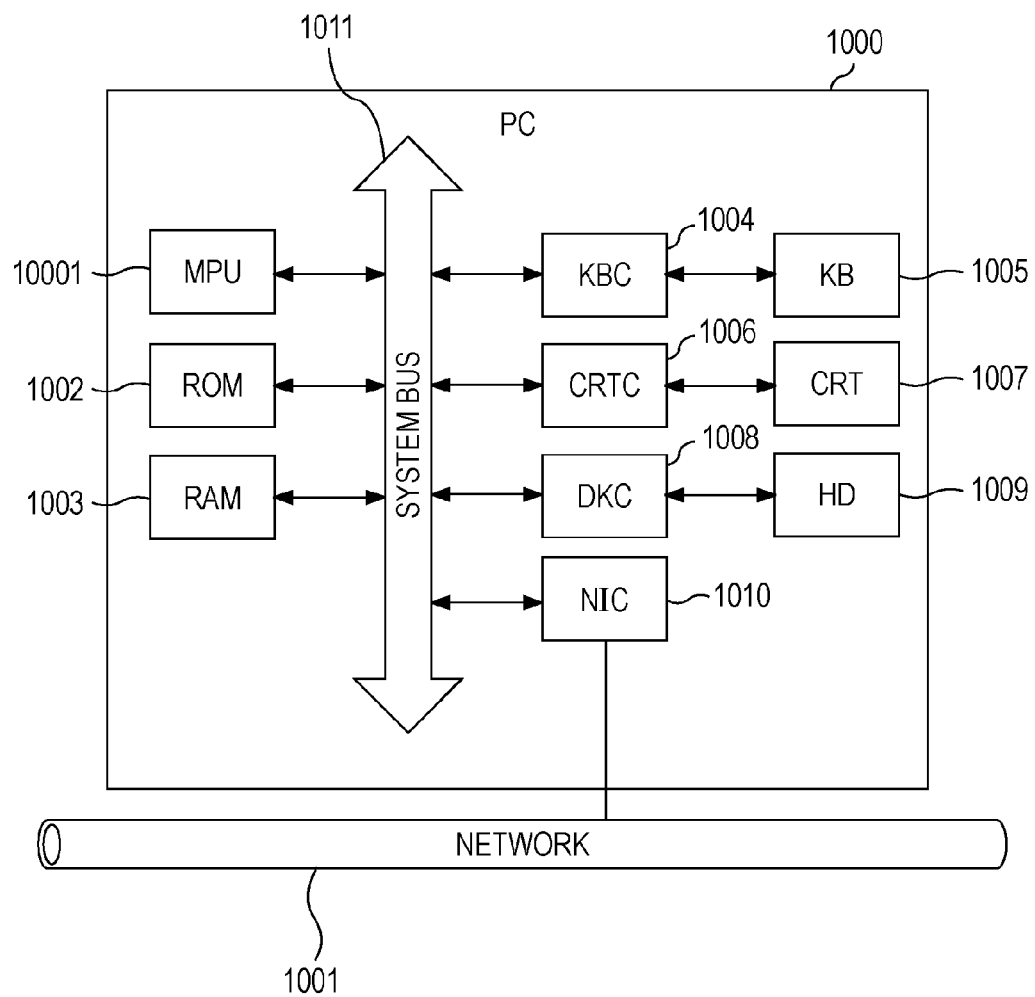
FIG. 10 is a block diagram of hardware in a server PC.
Figure 11:
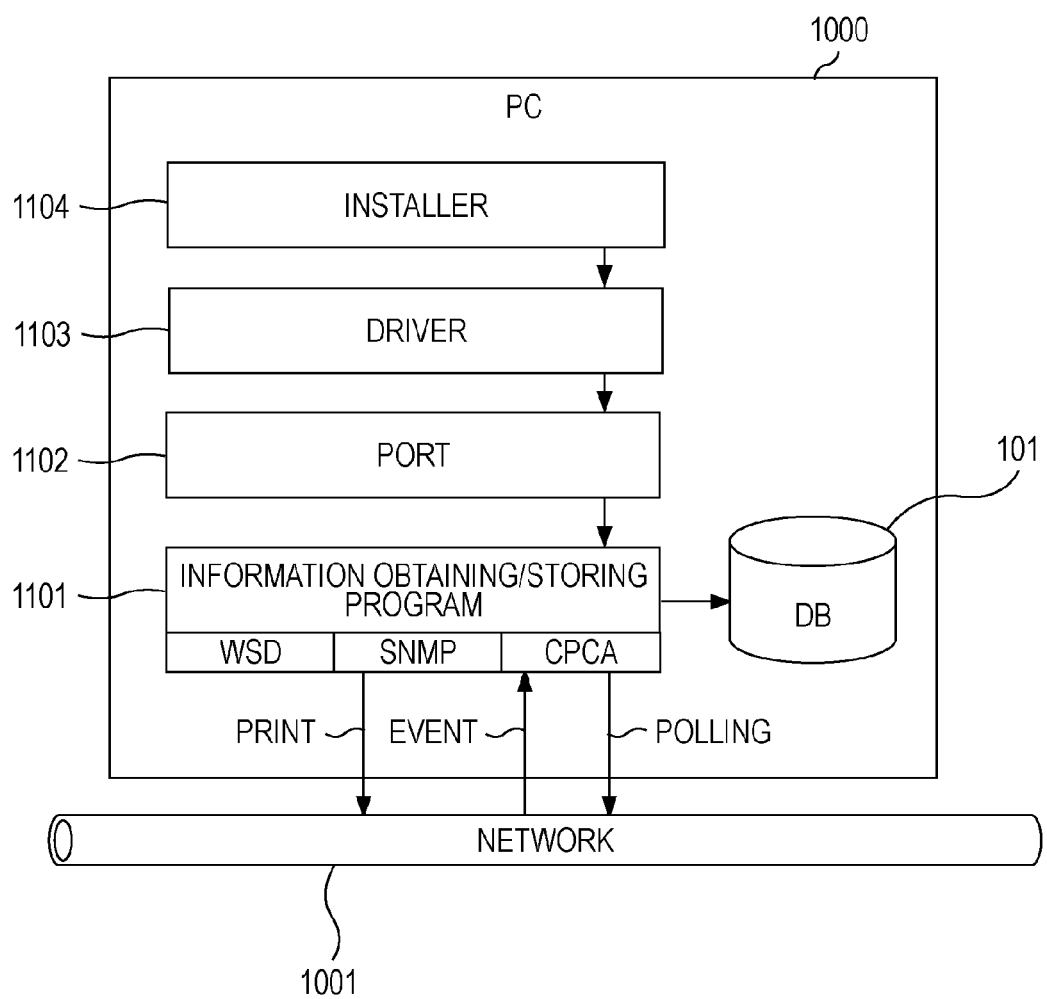
FIG. 11 is a block diagram of software in a client PC.

Information on printers is held in a repository such as a database (a database (DB) 101 in FIG. 11) by an administration utility of a printer management unit (a personal computer (PC) 1000 in FIGS. 10 and 11).

FIG. 10 shows the hardware configuration of a management unit according to an exemplary embodiment. A microprocessor unit (MPU) 10001 is an arithmetic unit in the management unit.

The MPU 10001 sends and receives signals to and from individual hardware components in FIG. 10, described below, via a system bus 1011. The individual hardware components are controlled by this operation. The individual hardware components will now be described.

A read only memory (ROM) 1002 is a non-volatile memory in the management unit. A random access memory (RAM) 1003 is a volatile memory in the management unit. Reference numeral 1005 denotes a keyboard (KB) (an input unit). A network interface card (NIC) 1010 is a network section and is an example of a communication unit and an example of a receiving unit. A network 1001 is connected to printers. The DB 101 is a database and stored in a hard disk (HD) 1009. Programs and associated data stored in the HD 1009 are read into the RAM 1003, and then the programs are executed by the MPU 10001. A cathode ray tube controller (CRTC) 1006 controls a CRT 1007 that is an example of a display unit. A keyboard controller (KBC) 1004 controls the KB 1005. DKC 1008 is disk controller which controls HD 1009.

A client PC 2001 that sends print data corresponds to FIG. 11. The hardware configuration of the client PC 2001 is similar to that in FIG. 10.

The held content includes information necessary to connect to IP addresses of printers in networks, information on whether the printers are power saving devices, information on whether events can be captured under, for example, Web Services on Devices (WSD) and Common Peripheral Controlling Architecture (CPCA), and Simple Network Management Protocol (SNMP) community names. These items of information are held as table information, as shown in FIG. 3.

However, any method for holding information can be used as long as necessary information can be held, and the method for holding information does not depend on a specific storage format, a specific storage method, and a specific storage medium.

Table information 3000 in FIG. 3 is stored in a hard disk in a server 2003 and managed by an administration utility 2004. Rows 3001 to 3006 each correspond to a single device. For example, reference to the row 3001 shows that the device identification (ID) 3007 of a corresponding device is 010101111111. The IP address 3008 of the device is 192.168.1.1. Since the device is not a power saving device, a corresponding flag 3009 is set to zero. Since WSD is available, a corresponding flag 3012 is set to one. Since CPCA is supported, a corresponding flag 3010 is set to one. The community name of the device in SNMP is defined as test in a corresponding column 3011. Persons skilled in the art will understand the meanings of the other rows 3002 to 3006 in FIG. 3.

Terms WSD, CPCA, and SNMP that are specific exemplary management protocols will now be described.

CPCA is a CANON-specific command architecture for using various office devices the specifications of which are managed by CANON KABUSHIKI KAISHA and functions of the office devices. CPCA protocol referred to in the specification is a protocol for communication with printers based on CPCA.

WSD is equivalent to Device Profile for Web Service disclosed by an organization called World Wide Web Consortium (W3C) and is a protocol for communication with printers that provide various types of service by exchanging messages described in an Extensible Markup Language (XML) format among the printers.

SNMP is a standard protocol for monitoring and controlling communication devices, such as routers, computers, and terminals, connected to Transmission Control Protocol/Internet Protocol (TCP/IP) networks via the networks. A device subjected to control has a management information database called a management information base (MIB), and a management device can select appropriate settings on the basis of the MIB of the device subjected to control.

Figure 9:
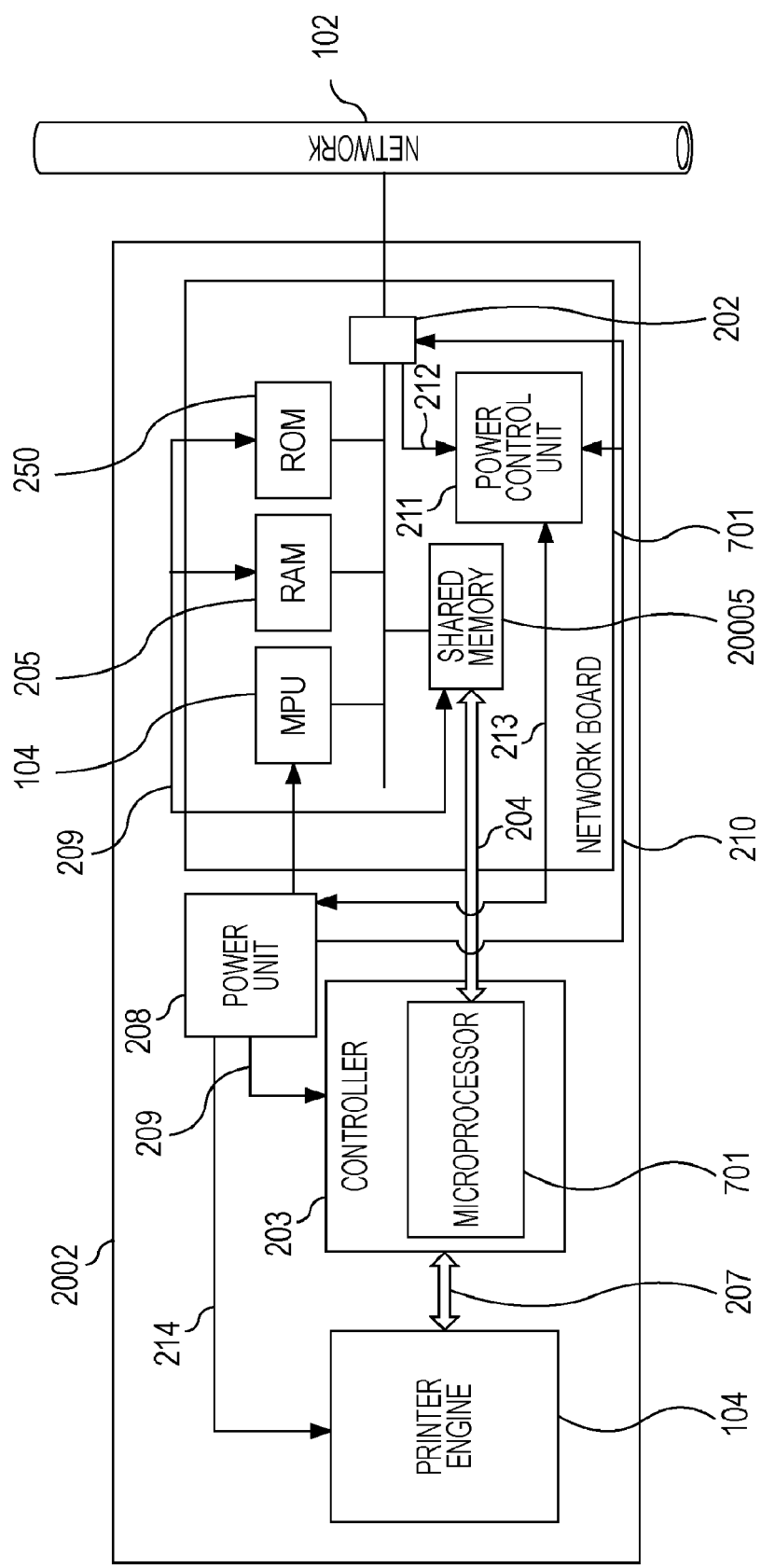
FIG. 9 is a block diagram of hardware in a printer.

In the procedure for obtaining information from a printer, software of the printer management unit (in the PC 1000 in FIG. 11) may actively perform polling, or the printer management unit (denoted by reference numeral 1000 in FIG. 10) may receive events from a printer (FIG. 9).

In this case, the timing of polling should be set so as to obtain information from a printer at intervals such that the printer is not prevented from transitioning to a power saving mode. A method that uses polling by which the software (in the PC 1000 in FIG. 11) actively obtains information on a printer will be described first.

Figure 2:
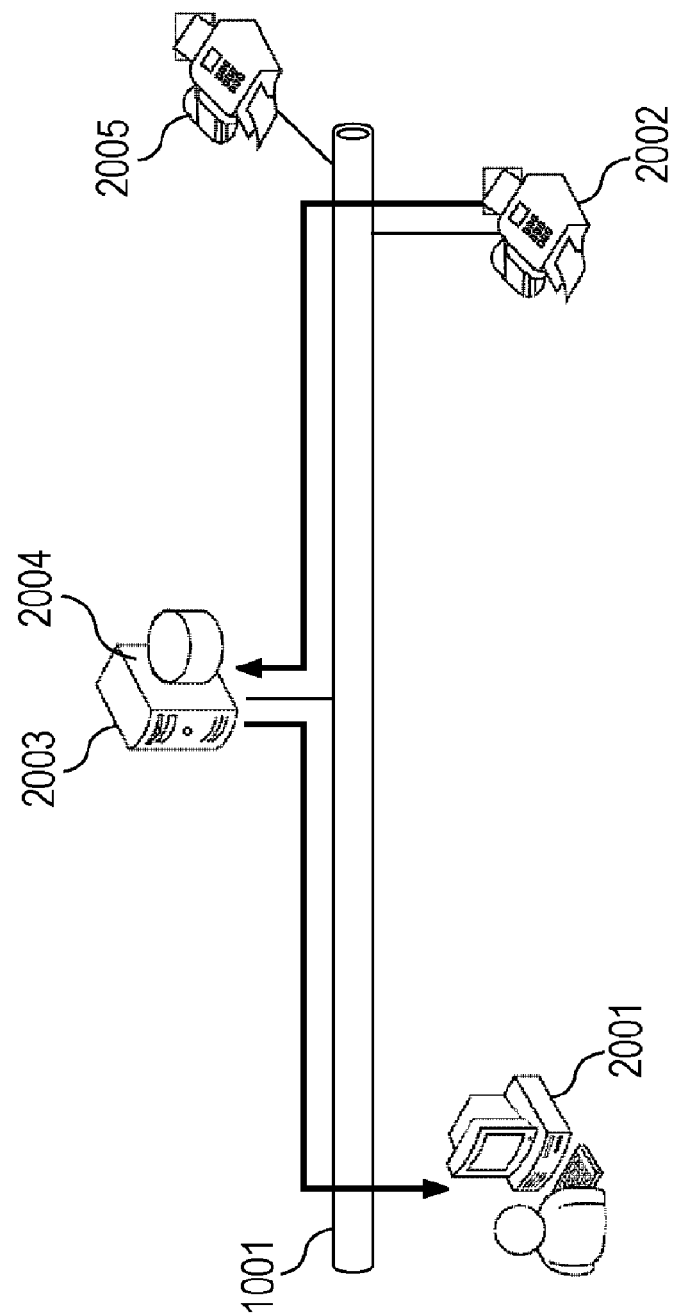
FIG. 2 shows the configuration of a system that is an example according to an exemplary embodiment.

FIG. 2 shows the configuration of a system according to an exemplary embodiment. The administration utility 2004 is installed in the server 2003 in advance. A printer driver for sending print data is installed in the client PC 2001. The printer driver and a port in the client PC 2001 are set up using the administration utility 2004. A port is a communication program for data traffic control. A corresponding device in FIG. 2 is a printer 2002 that is an example of an image forming apparatus. The printer 2002 has various types of function, such as a facsimile and a scanner.

Print data is sent to the printer 2002 directly or via the server 2003 by issuing a print instruction from the client PC 2001. The client PC 2001 and the server 2003 in FIG. 2 have the same configuration shown in FIG. 10. The client PC 2001 stores software blocks shown in FIG. 11 in the HD 1009. It is assumed that a plurality of printers, for example, a printer 2005, other than the printer 2002 exist in the network.

FIG. 11 is a block diagram showing exemplary software of a client PC. Reference numerals 1103 and 1104 denote a printer driver and an installer, respectively. The printer driver 1103 is installed in a predetermined storage area managed by an operating system (OS) by the installer 1104. Then, a port 1102 that is an example of a communication program is set for the printer driver 1103 by the installer 1104. Reference numeral 1101 denotes an information obtaining/storing program. The information obtaining/storing program 1101 is based on protocols including WSD, SNMP, and CPCA. The information obtaining/storing program 1101 obtains information from the printer 2002 by event capture or polling under these protocols. Event capture means receiving information that is actively sent by the printer 2002 without sending a request to the printer 2002. Polling means that the client PC 2001 sends a request to the printer 2002, and then the printer 2002 sends information to the client PC 2001 in response to the request.

Figure 12:
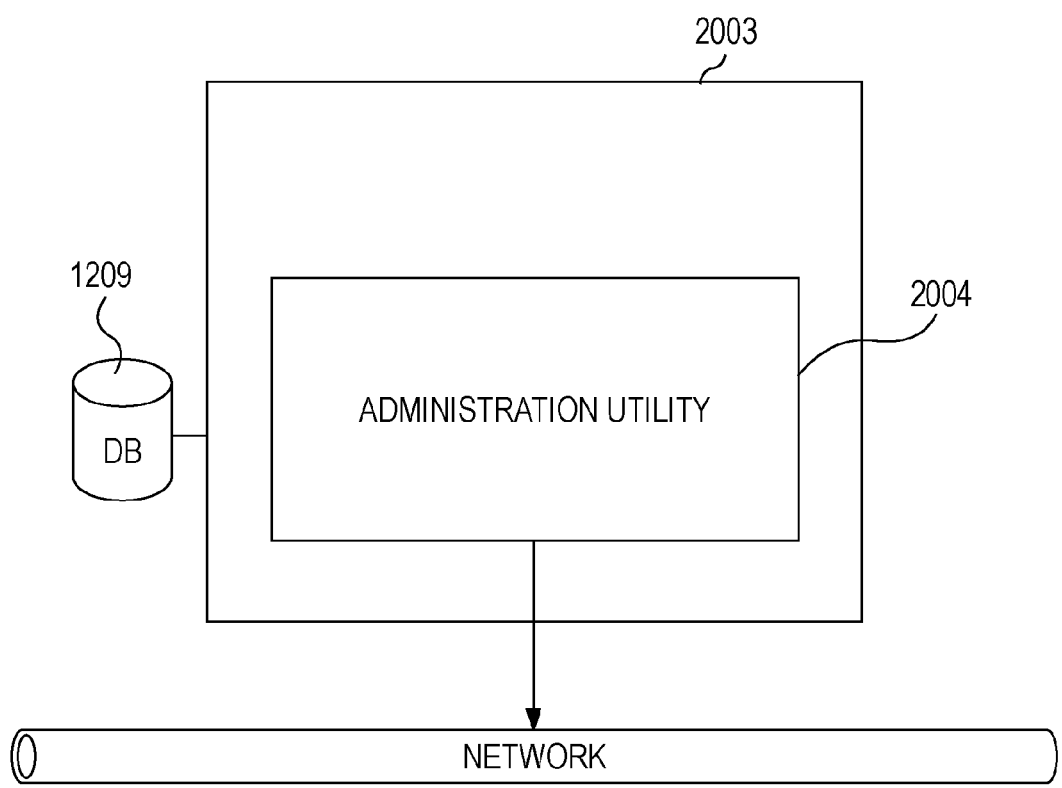
FIG. 12 is a block diagram of software in a server PC.

FIG. 12 shows the server PC 2003. The administration utility 2004 exists in the server PC 2003. The administration utility is a program having, for example, a network management function and a program distribution function. The administration utility is stored in the HD 1009 and executed by the MPU.

Figure 4:
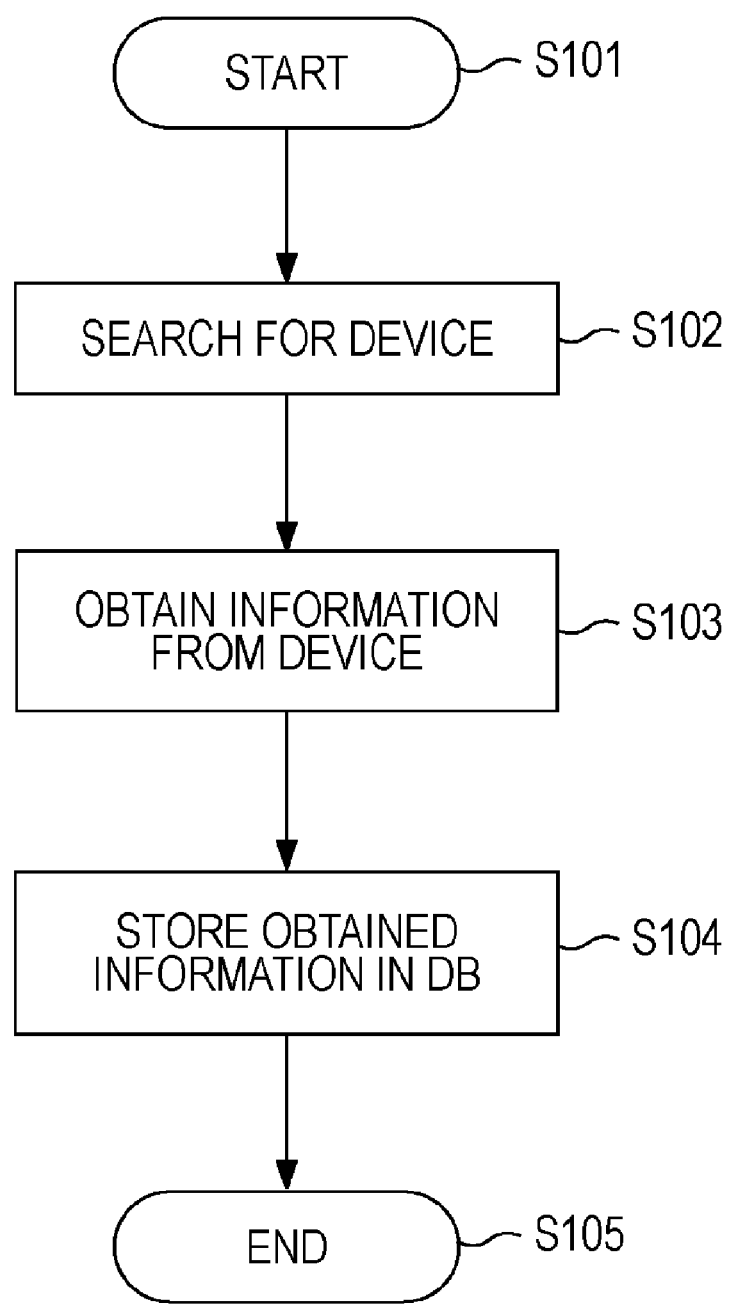
FIG. 4 is a flowchart of a process in which a server PC stores information from a printer in a database.

Information acquisition is started by a user in FIG. 2 by sending an operating instruction to obtain information on a printer to the administration utility 2004 in the server PC 2003 by operating the client PC 2001. In step S101 in FIG. 4, the process in which a server PC stores information from a printer in a database starts. In step S102 in FIG. 4, the administration utility, in which the operation for obtaining information on a printer has been performed, searches for printers. When the administration utility has found a printer, in step S103, the administration utility obtains information on the printer. In step S104, the obtained information is stored in the database of the administration utility. In step S105, the process in which a server PC stores information from a printer in a database ends.

Figure 5:
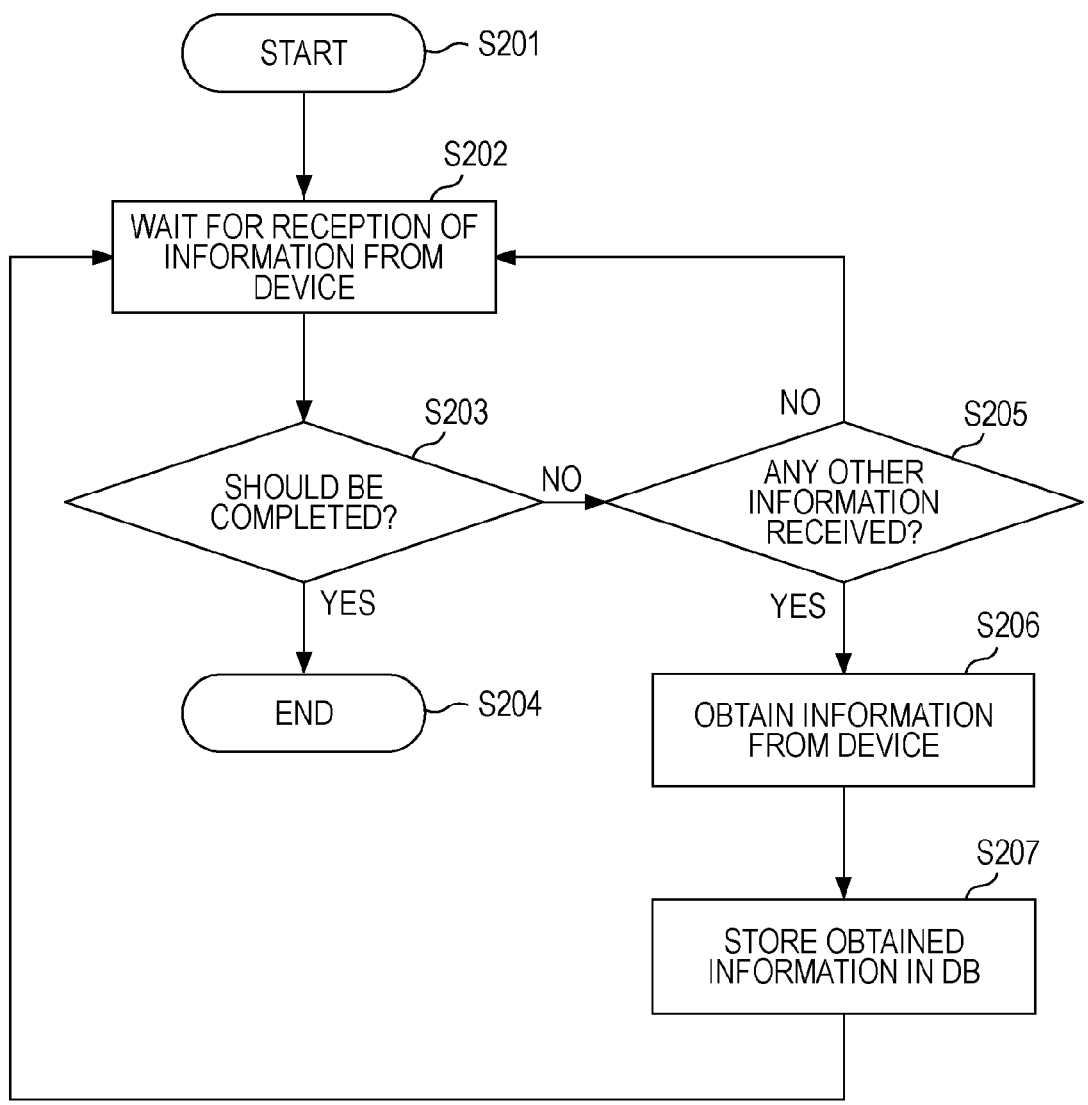
FIG. 5 is a flowchart of a process in which a server PC stores information obtained from a printer by event capture in a database.

A method for obtaining information on a printer by an event will now be described with reference to FIG. 5. When the administration utility in FIG. 2 has been activated in step S201 in FIG. 5, in step S202, the administration utility waits for an event to be input to the administration utility. When an event for indicating completion is input (yes at step S203), in step S204, the administration utility is completed. Otherwise (no at step S203), in step S205, it is determined whether any other event has occurred. When it is determined in step S205 that any information has been received from a printer, the process proceeds to step S206.

When the printer 2002 in FIG. 2 has issued an event, in step S206, the administration utility 2004 receives information from the printer 2002. Then, in step S207, the administration utility 2004 writes the obtained information into a DB 1209. When no event has been received in step S205, the process proceeds to step S202.

The obtained information is stored in the DB 1209 in a hard disk in the format of the table information shown in FIG. 3.

In polling, even when the status is not changed, communication occurs. In contrast, in event capture, only when the status is changed, communication with the printer 2002 occurs. Thus, the number of times a printer returns from a power saving mode can be reduced. Accordingly, when a printer has a power saving function, an event should be used as much as possible because a power saving mode can be kept for a long time.

A process of installing the driver will now be described.

Figure 6:
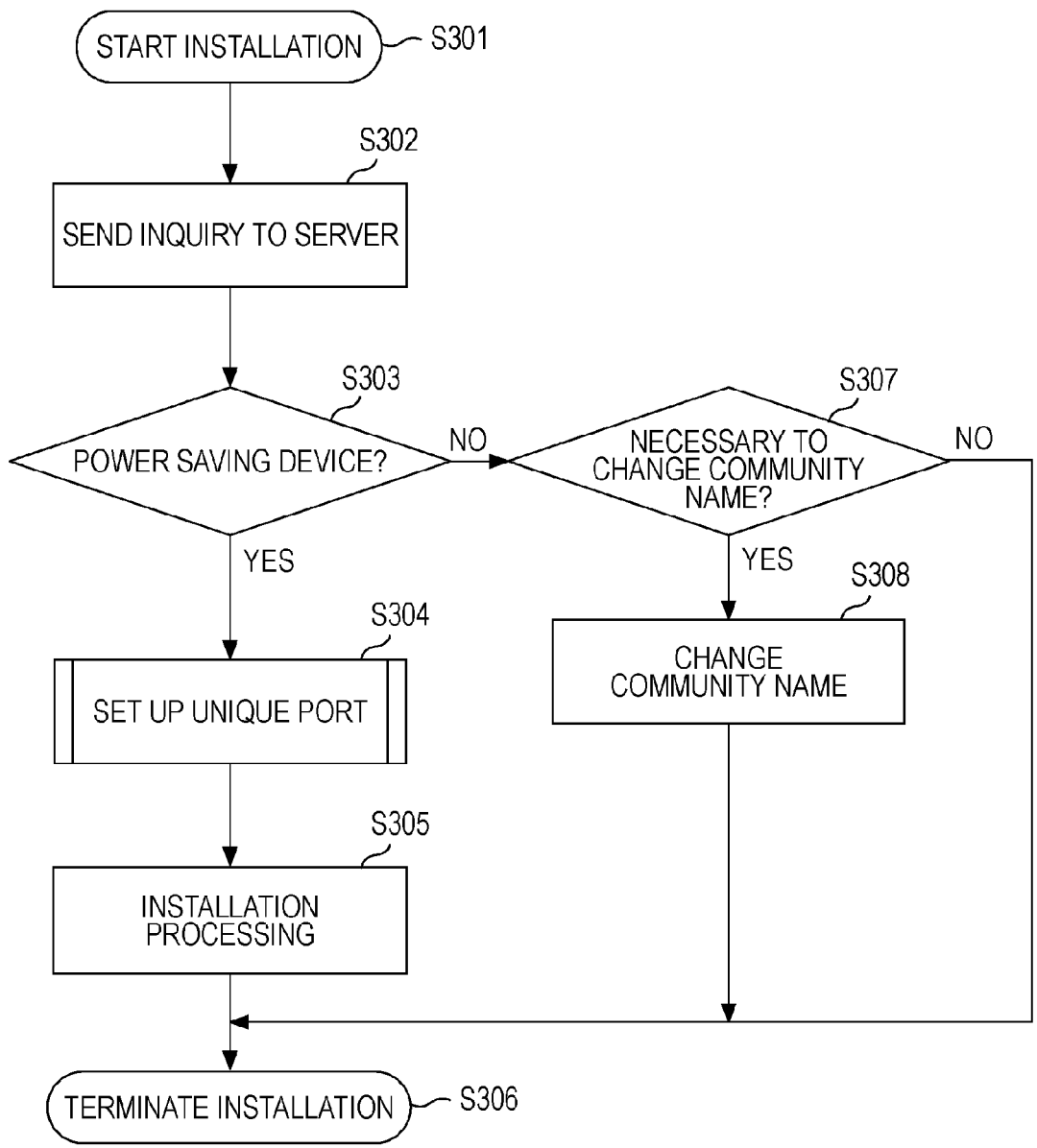
FIG. 6 is a flowchart of a process in which a method for obtaining information from a printer is changed on the basis of content held in a database in a server PC.

When installation of the driver is started in step S301 in FIG. 6, in step S302, the driver installer in the PC 1000 in FIG. 11 sends an inquiry to the administration utility in the server PC 2003 in FIG. 12. Then, in step S303, it is determined, on the basis of information obtained through the inquiry, whether a corresponding device is a power saving device. When it is determined that the corresponding device is a power saving device, in step S304, a unique port is set up. For example, a change is made so that polling by SNMP is not performed.

In the case of SNMP, for example, it is determined in the following manner whether a corresponding device is a power saving device. A client PC obtains, from a server PC, a part of a set of device information called an MIB based on SNMP. Information on whether a corresponding device is a power saving device is defined as an MIB value indicating whether the corresponding device is a power saving device. Then, the MIB value is set in the printer and sent to the server PC. In the case of WSD or CPCA, a server PC can obtain, from a printer, all information that can be obtained from the aforementioned MIB in a format according to each protocol.

In this case, for example, it is assumed that a corresponding MIB attribute is SleepSupported. When the bit value of the MIB attribute is one, a corresponding device is a power saving device. When the bit value is zero, the corresponding device is not a power saving device. Devices including the printer 2002 send such MIB information to the server.

When it is determined in step S303 that the corresponding device is not a power saving device, the process proceeds to step S307. In step S307, it is determined whether the community name needs to be changed.

When it is determined in step S307 that the community name in SNMP needs to be obtained from the administration utility and changed, in step S308, the community name is changed. Then, the process proceeds to step S306.

On the other hand, when it is determined in step S307 that the community name need not be changed, the process directly proceeds to step S306. This determination is made according to an administrator's management policy, using, for example, a preset flag.

In this case, in communication under SNMP, when setting such that a printer performs communication using its community name is not made, the community name cannot be obtained in SNMP. Thus, when a community name is known, the community name should be set so that the user need not make setting. A community name functions like password information or authentication information. A community name is a password necessary when, in SNMP, a manager communicates with an agent (a device subjected to control). In this case, a printer is a device subjected to control. A server PC and a client PC are exemplary information processing apparatuses.

The case where SNMP is used has been described. When another protocol is used instead of SNMP, information unique to the protocol may be needed. For example, Service Location Protocol (SLP) is used instead of SNMP, a scope name plays the same role as a community name.

After step S304, in step S305, processing necessary for installation of the driver is performed. For example, a user interface (UI) module of the driver and a module for generating print data are written to a predetermined area managed by the OS. This processing is performed by operating the OS by the installer. Then, in step S306, the installation is completed.

In the forgoing description, in step S304, a change is made so that an event is used instead of polling.

Specifically, software prepared in the system in advance is replaced with software prepared separately.

The software here means a print port that is used by the driver in FIG. 11. A print port is a module for sending print data from a PC to a printer. This module further obtains information on printers.

In a print port prepared in the system, restrictions may exist, for example, polling cannot be stopped in a default state at the time of installation. In this case, the print port is replaced with a unique print port that is specially prepared so as to enable operations such as suppressing polling. In the standard default port prepared in the system, detailed settings cannot be selected. Thus, in step S304, the enhanced unique port is set up instead of the standard default port prepared in the system.

A process in the software replaced in step S304 will now be described in detail with reference to FIG. 7. Settings on what is called a unique port will be described.

After the driver is installed and the setup of the unique port is completed in step S306, the process in the software is started from step S401.

In step S402, in the replaced software (the unique port), the process is first initialized so as to register, in an administration utility, information indicating that the software communicates with a printer for which the port is set up in a client PC.

However, another client PC may have already started to obtain information from the printer.

Thus, in step S403, in order to avoid obtaining redundant information, the installer in the client PC determines, by sending an inquiry to the administration utility, whether another client has already obtained information from the printer.

When the installer in the client PC determines that another client has been already set so as to obtain information from the printer, the process proceeds to step S404.

In step S404, the installer in the client PC performs setting on the client PC so that the unique port obtains information from the administration utility. Specifically, setting is performed so that an address from which the unique port obtains information is the address of the administration utility.

When it is determined in step S403 that another client has not obtained information from the printer yet, setting is performed on the client PC so that the client PC obtains information directly from the printer. Specifically, setting is performed so that an address from which the unique port in the client PC obtains information is the address of the printer.

Alternatively, the installer may perform setting such that the administration utility periodically obtains information from the printer, and the client PC obtains the information.

However, in a case where a driver in another client PC (not shown) obtains information from the same printer the next time, the method for obtaining information directly from the printer is replaced with the method for obtaining information via the administration utility.

In this arrangement, communication with the printer can be minimized, and thus a power saving mode can be kept as much as possible.

In step S405, a power saving protocol is available. The power saving protocol is described below. When the installer in the client PC determines that the power saving protocol is available, the process proceeds to step S406. When the installer determines that the power saving protocol is unavailable, the process proceeds to step S407. The statement that the power saving protocol is available means that setting such that the power saving protocol is enabled is selected from an operation panel of a printer or via networks.

In step S406, reception of an event is waited for under the power saving protocol.

In step S407, the installer in the client PC determines whether WSD is available. When the installer in the client PC determines that WSD is available, the process proceeds to step S408 where event capture by WSD is enabled. When the installer in the client PC determines that WSD is unavailable, the process proceeds to step S409.

In step S409, it is determined whether a CPCA event can be received.

When it is determined that a CPCA event can be received, the process proceeds to step S410 where reception of a CPCA event is enabled. When it is determined that a CPCA event cannot be received, the process proceeds to step S411.

That is to say, when any setting on event communication is not successfully completed, in step S411, polling is enabled.

However, when polling is enabled, polling is performed at sufficiently long intervals (for example, at least five minutes) so that the power saving mode is not cancelled as much as possible. In a case where settings are automatically selected at the time of installation so that polling is performed, a preset interval is used as an interval for polling. In this case, an interval for polling may set considering the performance of the printer.

The power saving protocol is a protocol in which, when a printer transitions to a power saving mode, a corresponding event (a sleep notification) is issued, and when the printer returns from the power saving mode, a return event is issued.

A detailed process under the power saving protocol will now be described. In this exemplary embodiment, three power modes are defined. FIG. 9 shows hardware included in the printer 2002.

In FIG. 9, a network interface unit 202 is an interface for connecting to a network 102. A controller 203 performs overall control of the printer 2002. The controller 203 is connected to an internal bus 204. The controller 203 is connected to a shared memory 20005 that stores programs operating in the controller 203 and temporarily stores print jobs, information, and the like as a work area. Moreover, the controller 203 is connected to an engine interface bus 207. The engine interface bus 207 is a bus for transferring image information between a printer engine 104 and the controller 203.

A power unit 208 supplies electrical power to individual components including the controller 203, the shared memory 20005, the engine interface bus 207, and the printer engine 104. A first power supply line 210 constantly supplies electrical power to the network interface unit 202 and a power control unit 211. A second power supply line 209 stops supplying electrical power in second and third power modes described below. A third power supply line 214 supplies electrical power to the printer engine 104 upon input of a print job. They are controlled by a seizing signal 212 from the network interface unit 202 and a power control signal 213 for controlling the power unit 208.

In a first power mode, first electrical power is supplied, second electrical power is not supplied, and the operation is performed in a power saving mode. The power mode transitions to the first power mode when no data packet has been received for a predetermined period.

In an operation in a power saving mode, electrical power is supplied only to the network interface unit 202 and the power control unit 211, an activation packet for returning to the second power mode is waited for. When an activation packet has been received, the seizing signal 212 is input to the power control unit 211. An activation packet is a pattern of a binary digit string that is predetermined in the network interface unit 202. When the power control unit 211 has received the seizing signal 212, the power control unit 211 sends the power unit 208 an instruction by the power control signal 213 so as to supply the second power supply line 209, so that the power mode returns to the second power mode, in which electrical power is supplied to components other than the network interface unit 202 and the power control unit 211. In this exemplary embodiment, when the client PC 2001 has polled a printer using an activation packet, the first power mode transitions to the second power mode. Thus, when, in the client PC 2001, the port is set so as to unnecessarily perform polling, the first power mode cannot be kept. Moreover, there are some instructions in some types of polling by which the power mode transitions to the third power mode described below. In this case, even the second power mode cannot be kept, so that much electrical power is consumed. In step S411 in FIG. 7, an interval for polling or event registration should be set appropriately.

Figure 1:
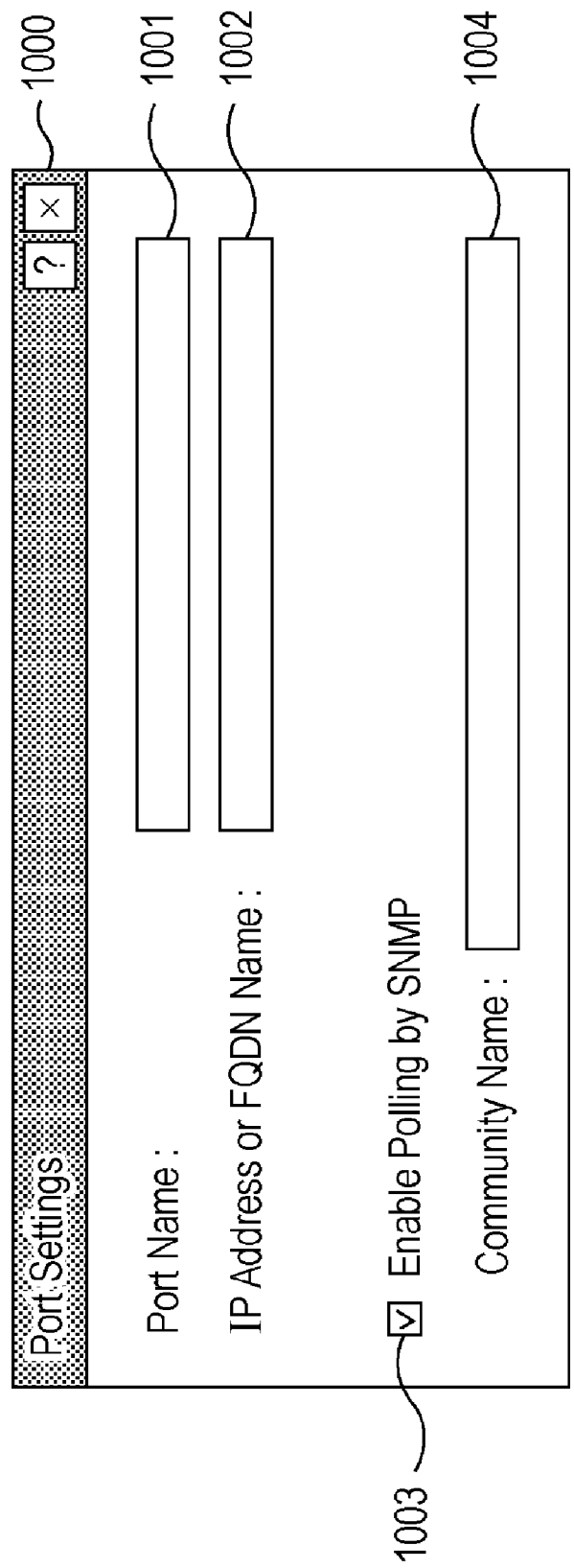
FIG. 1 shows an example of a user interface related to a printer driver at the time of installation of the driver.

For example, when the port is set up, using a user interface conventionally provided in an OS, as shown in FIG. 1, a check box 1003 is selected by default. Thus, even when a corresponding device is a power saving device, the power saving mode cannot be kept due to polling.

In this exemplary embodiment, the individual components shown in the drawing are activated by supplying electrical power to the individual components. However, the present invention is not limited to this case, and the power saving effect can be improved by activating only components necessary to achieve an object of the present invention. When it is determined that data of a print job has been received from an outside source in the second power mode, the power is controlled so as to transition to the third power mode. On the other hand, only information on a status, for example, the amount of remaining toner, has been received from an outside source without receiving data of a print job in the second power mode, the power mode need not necessarily transition to the third power mode. In this case, a status response may be returned while the second power mode is kept. An activation packet, or a magic packet, is a packet that includes a special data pattern in an Ethernet® frame. Moreover, when, after an activation packet is received, it is determined that a specific type of MIB information has been received, the printer transitions to the second power mode. Moreover, when, after an activation packet is received, it is determined that another specific type of MIB information has been received, the printer transitions to the third power mode.

Moreover, in the third power mode, at least the second electrical power and third electrical power are supplied, and the following normal operation is performed. Specifically, when the network interface unit 202 has received a print job in the form of packets from the network 102, the network interface unit 202 writes the data to a work area in the shared memory 20005. The controller 203 reassembles the print job in the form of packets according to the network protocol. Then, image data is generated and then sent to the printer engine 104 via the engine interface bus 207 to be printed.

Reference numeral 104 denotes a printer engine. An MPU 701 is a microprocessor in an image forming apparatus and performs overall control of individual units in FIG. 9. Reference numeral 2002 denotes a printer (an image forming apparatus main body). Reference numeral 102 denotes a network. An MPU 104 is a microprocessor in a network section. A RAM 205 is a volatile memory in the network section. A ROM 250 is a nonvolatile memory in the network section.

Figure 7:
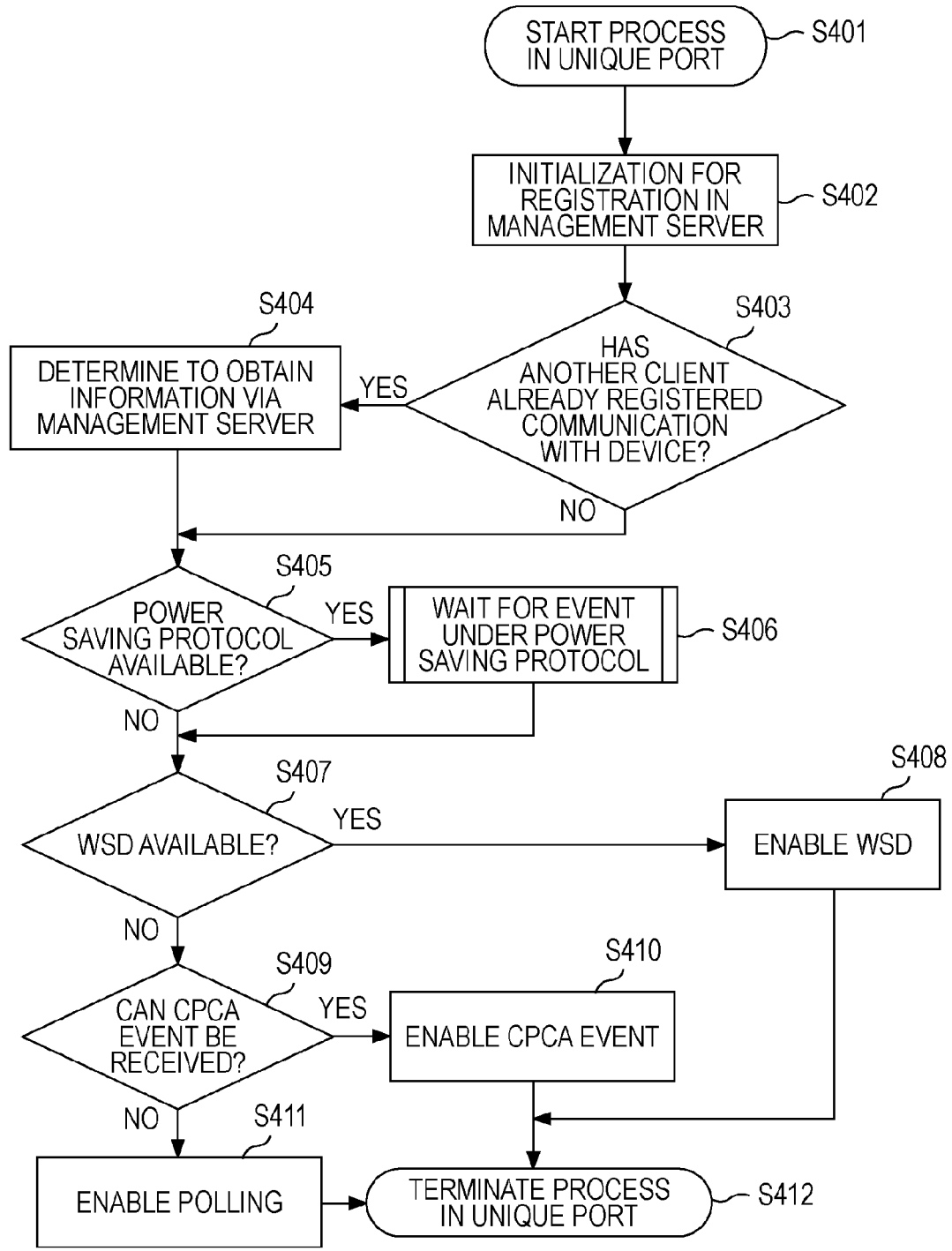
FIG. 7 is a flowchart of a process in a unique port that is replaced in a client PC.
Figure 8:
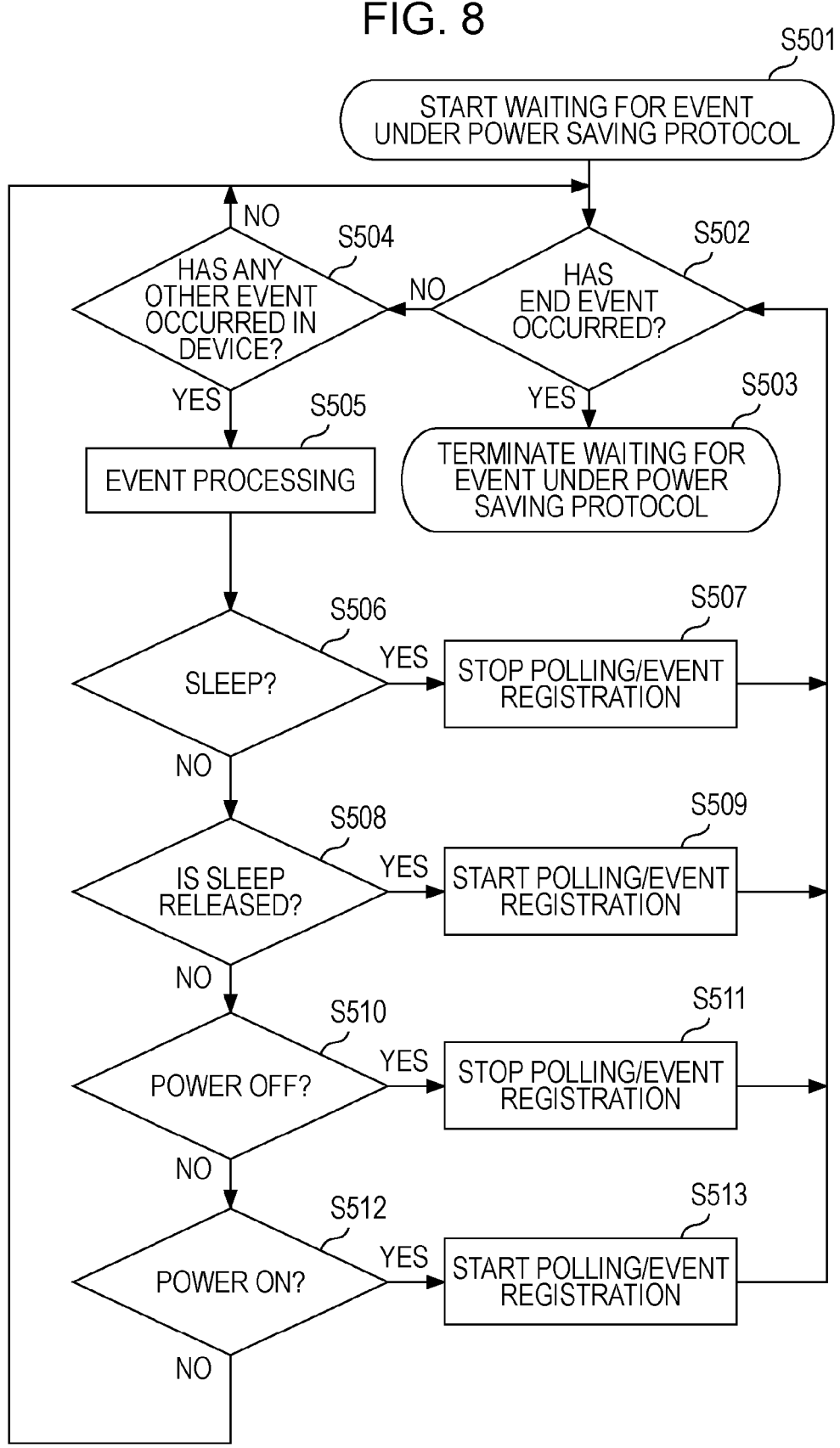
FIG. 8 is a flowchart of a process under a power saving protocol.

When the state transitions to a state in which an event is waited for under the power saving protocol in step S406 in FIG. 7, in step S501 in FIG. 8, the process under the power saving protocol is started.

In step S502, the unique port (the program) in the client determines whether an end event has occurred. When the unique port determines that an end event has occurred, the process proceeds to step S503 where the process is completed. An end event is an event in a case where an instruction to terminate the program in the unique port has been sent from, for example, another program or a case where an exception error has occurred.

On the other hand, when the unique port determines that any end event has not occurred, in step S504, the unique port determines whether the unique port has received any event that has occurred in the printer. When the unique port determines that the unique port has not received any event, the process returns to step S502.

On the other hand, when the unique port determines that the unique port has received an event from the printer, in step S505, the unique port determines the type of the event received from the printer.

Then, in step S506, the unique port determines, on the basis of the determined type of the event, whether the event indicates that the printer has transitioned to the power saving mode. Specifically, the unique port determines whether the event is what is called a sleep notification. Steps S507, S509, S511, and S513 are performed for the printer by the client PC, using SNMP.

When the unique port determines that the event indicates that the printer has transitioned to the power saving mode, the process proceeds to step S507. In step S507, polling from the server PC 2003 for checking the status of the printer, or reception of an event from the printer is stopped.

Event registration in a printer will now be described. A request that, when a specific event has occurred in a printer, the printer should send a client PC a notification that the specific event has occurred in the printer needs to be registered in the printer as an event so that the client PC can receive the event from the printer. This is event registration. In this exemplary embodiment, the printer periodically deletes events registered by the client PC one by one in chronological order. The client PC periodically updates the content of event registration in the printer. In this arrangement, the client PC can receive events, in the printer, corresponding to the registered content.

Stopping reception of an event in step S507 means stopping the client PC from updating and registering an event in the printer.

When the unique port determines in step S506 that the received event does not indicate that the printer has transitioned to the power saving mode, the process proceeds to step S508. In step S508, the unique port determines whether the event indicates that the printer has been released from the power saving mode. When the unique port determines that the event indicates that the printer has been released from the power saving mode, in step S509, the client PC starts to poll the printer and receive an event from the printer. Starting reception of an event means starting or restarting updating and registration of an event in the printer, as described above.

On the other hand, when the unique port determines that the event does not indicate that the printer has been released from the sleep mode, the process proceeds to step S510. In step S510, the unique port determines whether the event indicates that the power of the printer has been turned off. When the unique port determines that the event indicates that the power of the printer has been turned off, the process proceeds to step S511. In step S511, processing similar to that in step S507 is performed, and the process returns to step S502.

On the other hand, when the unique port determines that the event does not indicate that the power of the printer has been turned off, the process proceeds to step S512. In step S512, the unique port determines whether the event indicates that the power of the printer has been turned on. When the unique port determines that the event indicates that the power of the printer has been turned on, the process proceeds to step S513. In step S513, processing similar to that in step S509 is performed, and the process returns to step S502. On the other hand, when the unique port determines that the event does not indicate that the power of the printer has been turned on, the process directly returns to step S502.

FIG. 13 shows, on the basis of the flag 3009 in FIG. 3, whether image forming apparatuses, such as printers and multi functional printers, are power saving apparatuses. In a field 1301, information indicating that an apparatus is not a power saving apparatus is shown when the value of a corresponding flag is zero, and information indicating that an apparatus is a power saving apparatus is shown when the value of a corresponding flag is one. Information of the row 3006 in FIG. 3 is not shown in the drawing.

The client PC obtains information in FIG. 3 held by the administration utility, and the information obtaining/storing program 1101 in the client PC displays the information on the CRT 1007, which is a display unit.

In this exemplary embodiment, the quiescent operating state of a printer can be more efficiently kept without manually changing settings by users. Moreover, the state of a printer can be readily directed to a quiescent operating state by minimizing communication with the printer by enabling, for example, acquisition of the state via a management server, a quiescent operating state notification protocol, and event reception.

A system that includes a server PC, a printer, and a client PC that performs printing in the printer has been disclosed. In this case, when a printer driver is installed in the device, which performs printing in the printer, a program sends an inquiry on the support status of a power saving function of the printer to the server PC, which communicates with the printer in advance and includes a list of functions of the printer. Then, when the printer is a device that supports a power saving function, the program makes a change so as to obtain the state of the printer from the server PC to avoid redundant accesses to the printer by changing settings of the printer driver. When the power saving protocol is available, the program changes settings so that an event is received under the power saving protocol. Moreover, it is determined whether an event can be received. When an event can be received, reception of an event is enabled. When an event cannot be received, setting is performed so as to perform polling instead.

Moreover, a technique used when a printer driver is installed in a client PC that performs printing in a printer has been disclosed. An inquiry on the support status of a power saving function of a printer is sent to a server PC that communicates with the printer in advance and includes a list of functions of the printer, using a program. The program performs the following process. When the printer supports a power saving function, settings of the printer driver are changed so as to obtain the state of the printer from the server PC to avoid redundant accesses to the printer. When the power saving protocol is available, settings are changed so that an event is received under the power saving protocol. Moreover, it is determined whether an event can be received using a specific printer management protocol. When an event can be received using a specific printer management protocol, reception of an event using the specific printer management protocol is enabled. When an event cannot be received under WSD, setting is performed so as to perform polling instead.

In a system that includes a server PC, a printer, and a device that performs printing in the printer, the following process is performed by executing a program. When a printer driver is installed in the device, which performs printing in the printer, an inquiry on the support status of a power saving function of the printer is sent to the server PC, which communicates with the printer in advance and includes a list of functions of the printer. When the printer is a device that supports a power saving function, settings of the printer driver are changed so as to obtain the state of the printer from the server PC to avoid redundant accesses to the printer. When the power saving protocol is available, settings are changed so that an event is received under the power saving protocol. Moreover, it is determined whether an event can be received. When an event can be received, reception of an event is enabled. When an event cannot be received, setting is performed so as to perform polling instead.

In a system that includes a server PC, a printer, and a device that performs printing in the printer, the following process is performed. When a printer driver is installed in the device, which performs printing in the printer, an inquiry on the support status of a power saving function of the printer is sent to the server PC, which communicates with the printer in advance and includes a list of functions of the printer. When the printer is a device that supports a power saving function, settings of the printer driver are changed so as to obtain the state of the printer from the server PC to avoid redundant accesses to the printer. When the power saving protocol is available, settings are changed so that an event is received under the power saving protocol. Moreover, it is determined whether an event can be received under CPCA or WSD. When an event can be received under CPCA or WSD, reception of an event under CPCA or WSD is enabled. When an event cannot be received under CPCA or WSD, setting is performed so as to perform polling instead.

The client PC 2001, which sends data to the printer 2002 and causes the printer 2002 to generate an image, includes the NIC 1010, which receives MIB information that is sent from the printer 2002 and an example of information indicating whether the printer 2002 has a power saving function. Moreover, the MPU 10001 determines, using the MIB information received via the NIC 1010, whether the image forming apparatus has a power saving function.

The MPU 10001 sets up the communication program in the client PC so as to reduce the number of times the power saving mode of a printer having a power saving function is released due to communication between the client PC and the printer.

The MPU 10001 may perform setting such that an interval for obtaining information from a printer that is determined as having a power saving function is longer than an interval for obtaining information from a printer that is determined as having no power saving function.

The MPU 10001 selects settings of a port of a communication program that communicates with a printer that is determined as having a power saving function different from settings of a port of a communication program that communicates with a printer that is determined as having no power saving function. In this arrangement, the power saving mode of an image forming apparatus that is determined as having a power saving function can be kept.

Icons representing image forming apparatuses having a power saving function and image forming apparatuses having no power saving function are displayed on the CRT 1007, using the result of the foregoing determination, as shown in FIG. 13, so that they can be distinguished from each other. The texts which indicate image forming apparatuses can be used instead of Icons. The Icons and the texts are an example of display objects.

The MPU 10001 performs determination using the MIB information (FIG. 3) received by the NIC 1010.

The MPU 10001 may perform setting such that a port (a unique port) of a communication program that communicates with an image forming apparatus that is determined as having a power saving function does not periodically obtain information. In this arrangement, the MPU 10001 can keep the power saving mode of a printer that is determined as having a power saving function.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2006-344281 filed Dec. 21, 2006 and No. 2007-318479 filed Dec. 10, 2007, which are hereby incorporated by reference herein in their entirety.

What is claimed is:

1. An information processing apparatus that sends data to an image forming apparatus and causes the image forming apparatus to generate an image, the information processing apparatus comprising:
    a receiving unit configured to receive information that is sent from an image forming apparatus and indicates whether the image forming apparatus has a power saving function;
    a determination unit configured to determine, on the basis of the information received by the receiving unit, whether the image forming apparatus has the power saving function; and
    a setting unit configured to perform setting on a communication program in the information processing apparatus so as to reduce a number of times a power saving mode of the image forming apparatus having the power saving function is released due to communication between the information processing apparatus and the image forming apparatus,
    wherein the setting unit performs setting such that an interval for obtaining information from the image forming apparatus that is determined by the determination unit as having the power saving function is longer than an interval for obtaining information from an image forming apparatus that is determined by the determination unit as having no power saving function.

2. An information processing apparatus that sends data to an image forming apparatus and causes the image forming apparatus to generate an image, the information processing apparatus comprising:
    a receiving unit configured to receive information that is sent from an image forming apparatus and indicates whether the image forming apparatus has a power saving function;
    a determination unit configured to determine, on the basis of the information received by the receiving unit, whether the image forming apparatus has the power saving function; and
    a setting unit configured to perform setting on a communication program in the information processing apparatus so as to reduce a number of times a power saving mode of the image forming apparatus having the power saving function is released due to communication between the information processing apparatus and the image forming apparatus, wherein, in order to keep the power saving mode, the setting unit selects settings of a port of a communication program that communicates with the image forming apparatus, which is determined as having the power saving function, different from settings of a port of a communication program that communicates with an image forming apparatus that is determined as having no power saving function.

3. An information processing apparatus that sends data to an image forming apparatus and causes the image forming apparatus to generate an image, the information processing apparatus comprising:

a receiving unit configured to receive information that is sent from an image forming apparatus and indicates whether the image forming apparatus has a power saving function;

a determination unit configured to determine, on the basis of the information received by the receiving unit, whether the image forming apparatus has the power saving function, wherein the determination unit performs determination using MIB information received by the receiving unit; and a setting unit configured to perform setting on a communication program in the information processing apparatus so as to reduce a number of times a power saving mode of the image forming apparatus having the power saving function is released due to communication between the information processing apparatus and the image forming apparatus, wherein, in order to keep a power saving mode, the setting unit performs setting such that a port of a communication program that communicates with the image forming apparatus, which is determined as having the power saving function, does not periodically obtain information.

4. An information processing method for sending data to an image forming apparatus and causing the image forming apparatus to generate an image, the method comprising:

receiving information that is sent from an image forming apparatus and indicates whether the image forming apparatus has a power saving function;

determining, on the basis of the information, whether the image forming apparatus has the power saving function; and performing setting on a communication program in the information processing apparatus so as to reduce a number of times a power saving mode of the image forming apparatus having the power saving function is released due to communication between the information processing apparatus and the image forming apparatus, wherein the setting comprises setting such that an interval for obtaining information from the image forming apparatus that is determined as having the power saving function is longer than an interval for obtaining information from an image forming apparatus that is determined as having no power saving function.

5. An information processing method for sending data to an image forming apparatus and causing the image forming apparatus to generate an image, the method comprising:

receiving information that is sent from an image forming apparatus and indicates whether the image forming apparatus has a power saving function;

determining, on the basis of the information, whether the image forming apparatus has the power saving function; and performing setting on a communication program in the information processing apparatus so as to reduce a number of times a power saving mode of the image forming apparatus having the power saving function is released due to communication between the information processing apparatus and the image forming apparatus, wherein, in order to keep the power saving mode, the setting comprises selecting settings of a port of a communication program that communicates with the image forming apparatus, which is determined as having the power saving function, different from settings of a port of a communication program that communicates with an image forming apparatus that is determined as having no power saving function.

6. An information processing method for sending data to an image forming apparatus and causing the image forming apparatus to generate an image, the method comprising:

receiving information that is sent from an image forming apparatus and indicates whether the image forming apparatus has a power saving function;

determining, on the basis of the information, whether the image forming apparatus has the power saving function, wherein the determining comprises determining using MIB information; and performing setting on a communication program in the information processing apparatus so as to reduce a number of times a power saving mode of the image forming apparatus having the power saving function is released due to communication between the information processing apparatus and the image forming apparatus, wherein, in order to keep a power saving mode, the setting comprises selecting settings such that a port of a communication program that communicates with the image forming apparatus, which is determined as having the power saving function, does not periodically obtain information.

7. An information processing apparatus that sends data to an image forming apparatus and causes the image forming apparatus to generate an image, the information processing apparatus comprising:

a receiving unit configured to receive information that is sent from an image forming apparatus and indicates whether the image forming apparatus has a power saving function;

a determination unit configured to determine, on the basis of the information received by the receiving unit, whether the image forming apparatus has the power saving function; and a display unit configured to display a display object representing an image forming apparatus having a power saving function and a display object representing an image forming apparatus having no power saving function, using the result of the determination by the determination unit, so that the image forming apparatus having the power saving function can be distinguished from the image forming apparatus having no power saving function.

8. An information processing method for sending data to an image forming apparatus and causing the image forming apparatus to generate an image, the method comprising:

receiving information that is sent from an image forming apparatus and indicates whether the image forming apparatus has a power saving function;

determining, on the basis of the information, whether the image forming apparatus has the power saving function; and displaying a display object representing an image forming apparatus having a power saving function and a display object representing an image forming apparatus having no power saving function, using the result of the determining, so that the image forming apparatus having the power saving function can be distinguished from the image forming apparatus having no power saving function.

9. A computer-readable storage medium that stores a control program causing a computer to perform a method for sending data to an image forming apparatus and causing the image forming apparatus to generate an image, the method comprising:

receiving information that is sent from an image forming apparatus and indicates whether the image forming apparatus has a power saving function;

determining, on the basis of the information, whether the image forming apparatus has the power saving function; and displaying a display object representing an image forming apparatus having a power saving function and a display object representing an image forming apparatus having no power saving function, using the result of the determining, so that the image forming apparatus having the power saving function can be distinguished from the image forming apparatus having no power saving function.

* * * * *